UNITED STATES PATENT OFFICE.

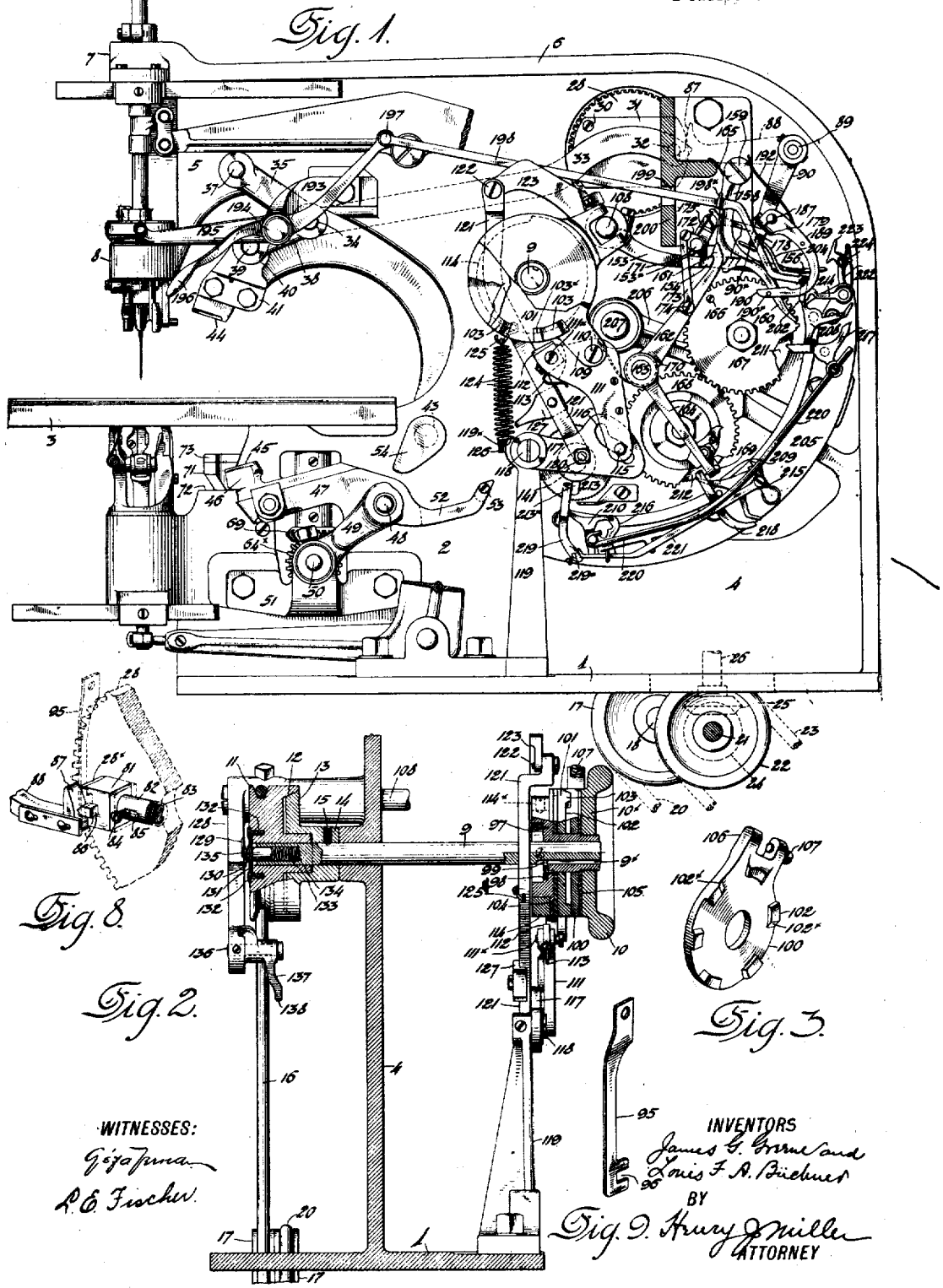

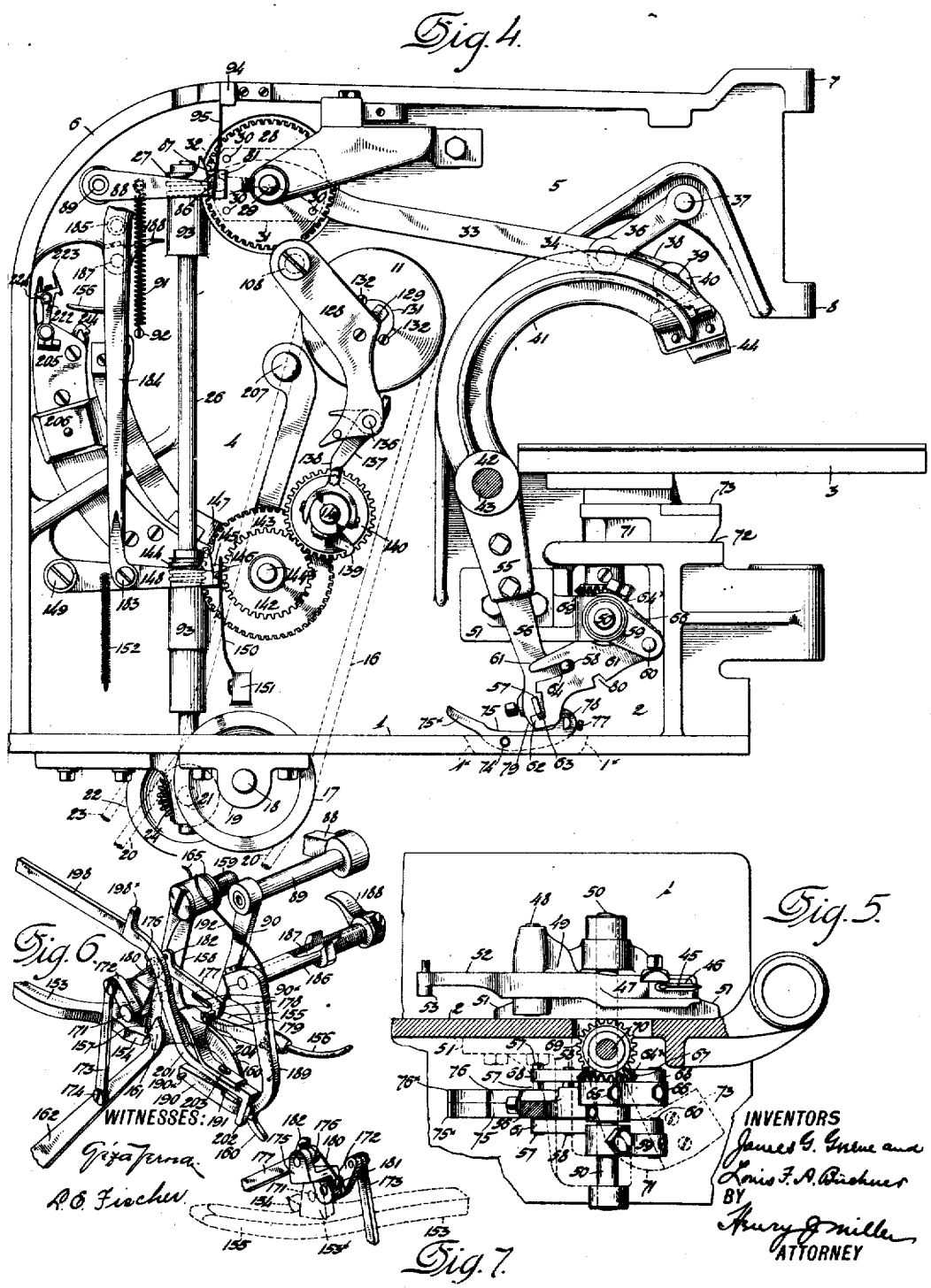

JAMES G. GREENE AND LOUIS F. A. BÜCHNER, OF ELIZABETH, NEW JERSEY, ASSIGNORS TO THE SINGER MANUFACTURING COMPANY, A CORPORATION OF NEW JERSEY.

BUTTONHOLE STITCHING AND CUTTING MACHINE.

1,208,951.

Specification of Letters Patent. Patented Dec. 19, 1916.

Application filed March 22, 1912. Serial No. 685,490.

*To all whom it may concern:*

Be it known that we, JAMES G. GREENE and LOUIS F. A. BÜCHNER, citizens of the United States, residing at Elizabeth, in the county of Union and State of New Jersey, have invented certain new and useful Improvements in Buttonhole Stitching and Cutting Machines, of which the following is a specification, reference being had therein to the accompanying drawings.

This invention has for its primary object to provide means whereby the automatically controlled slit-cutting action of a buttonhole stitching and cutting machine may be prevented at the will of the operator.

It has for its further objects to provide a special form of controlling means for the main-shaft which drives the stitch-forming mechanism and a special form of connection between the same and the cutter-controlling means by which the cutting mechanism is normally thrown into action but which may be rendered ineffective so as to prevent a cutting action.

According to the present invention, in its preferred embodiment, the buttonhole stitching machine is provided with stitch-forming and cutting mechanisms each adapted for connection independently of the other with its own driving element, and said mechanisms are adapted to be connected successively with their respective driving elements by means of a starting device having connected therewith and controllable thereby a device for preventing the coupling of the cutting mechanism with its driving element.

The invention will be understood by reference to the accompanying drawings, in which—

Figure 1 is a front side elevation of a buttonhole cutting and stitching machine of substantially the construction represented in our Patent No. 1,035,344, dated August 13, 1912, and Fig. 2 a transverse section of the same through the axis of the main-shaft to show the constructive features of the stop-motion. Fig. 3 is a perspective view of one of the members of the stop-motion. Fig. 4 is a rear side elevation of the machine, with certain parts omitted, and Fig. 5 a plan of certain parts of the cutting mechanism beneath the work-plate. Figs. 6 and 7 are perspective views showing portions of the mechanism for controlling the action of the stop-motion and cutting mechanism. Figs. 8 and 9 represent details of the cutter-shaft controlling device.

As represented in the drawings, the machine is constructed with a frame comprising a bed-plate 1 from which rises a vertical web forming the lower base member 2 supporting the fixed work-plate 3, the standard 4 and overhanging arm 5 constituting the upper frame-member, which latter, with the standard 4, is strengthened by the rib 6 extending from the rear of the bed-plate upwardly and forwardly to the upper boss 7 affording one of the bearings of the needle-bar bushings, the other of which is journaled in the lower bearing boss 8. The stitch-forming and feeding mechanisms are or may be constructed substantially as shown and described in our United States Patent No. 949,729, dated February 15, 1910, and Patent No. 1,030,998, dated July 2, 1912, respectively.

Journaled in suitable bearings in the standard 4 is the main or driving shaft 9 from which the stitch-forming and feeding mechanisms derive their operative movements. The main-shaft has fixed upon its forward end the hand-wheel 10 and loosely mounted upon its rearward end a peripherally grooved pulley-wheel 11 having in its inner face a cavity provided with a conical rim 12 to afford a clutch member adapted to be forced into operative relation with a clutch member 13 having its hub 14 fixed upon the main-shaft by means of the set-screw 15. The pulley-wheel 11 is provided with a peripheral groove adapted to receive a driving belt 16 extending from the double grooved pulley 17 upon a counter-shaft 18 mounted in the bearings 19 depending from the bed-plate and driven by a belt 20 from the source of power.

Suitably mounted in bearing brackets beneath the bed-plate 1 is a second counter-shaft 21 provided with a grooved pulley 22 embraced by a belt 23 from the source of power. The shaft 21 carries a bevel-gear 24 meshing with a bevel-pinion 25 fixed upon the upright worm-shaft 26 journaled in suitable bearings of the frame and provided at its upper end with a worm 27 meshing with the peripheral worm-teeth of a crank-disk 28 mounted upon the transverse cutter-shaft 29 which is journaled upon the standard of the bracket-arm.

To the forward face of the crank-disk 28 is secured by means of screws 30 a plate 31 carrying the crank-pin 32 embraced by the apertured rearward end of a pitman 33 having its apertured opposite end pivotally connected by means of the pin 34 with a pair of links 35 and 36 mounted upon the transverse fulcrum-pin 37 journaled in the upper frame-member 5. The links 35 and 36 are connected by means of the pivotal pin 34 with the upper end of the link 38 whose apertured opposite end is connected by means of the pin 39 with a lug 40 upon the arched arm 41 of the upper-cutter carrying rock-lever having its hub 42 fixed upon the transverse rock-shaft 43 journaled in the machine frame. The links 35 and 36 form, with the link 38 connected therewith by the pivotal pin 34, an actuating toggle operated by the crank-pin 32 through the pitman 33 to rock the arm 41 upon and with the supporting rock-shaft 43 serving as its fulcrum.

Secured to the outer end of the rock-lever arm 41 by suitable means is the cutter-block 44 whose lower edge affords a flat seat for the cutting edge 45 of the cutting member 46 secured upon the top of the forwardly extending arm 47 of a rock-lever journaled upon the fulcrum-pin 48 of a hanger 49 fixed upon the rock-shaft 50 which is journaled in the bearing brackets 51. The lower-cutter carrying rock-lever has a backwardly extending arm 52 provided with a laterally extending stud 53 adapted for engagement by a cam 54 fixed upon the rock-shaft 43.

The upper-cutter carrying rock-lever has a depending arm 55 with an extension 56 which carries near its lower end a transverse clutch-pin 57 having oppositely extending flattened portions. The member 56 also carries a transverse guide-pin 58 extending from its opposite faces. Fixed upon the rock-shaft 50 is a crank-arm 59 carrying a fulcrum-pin 60 embraced by the apertured forward extremity of the link 61 having at its rearward extremity near the lower edge a lug 62 formed in the upper edge with a notch 63 loosely fitted to the pin-extension 57 but of less depth. The link 61 is also formed with a curved cam-slot 64 embracing the pin-extension 58 of the arm 56 and slightly eccentric to the rock-shaft 43. As the upper cutter-carrying arm 41 is moved upon its fulcrum 43 to depress the cutter 44, the arm 56 acts through its clutch-pin 57 and the notched lug 62 of the link 61 to turn the crank-arm 59 by which the rock-shaft 50 is turned so as to move the hanger 49 forwardly to shift the cutter 46 from retracted inoperative position into register with the cutter 44, and the lower-cutter carrying rock-lever is simultaneously tilted by the action of the cam 54 to move the lower cutter 46 upwardly toward the upper cutter.

Loosely mounted upon the shaft 50 is a bevel-gear $64^x$ having secured upon its hub by means of the set-screw 65 the hub of a crank-arm 66 carrying the fulcrum-pin 67 embraced by the apertured forward extremity of a link 68 formed similarly to the link 61 with a notched lug to receive the other pin-extension 57 and with a cam-slot to embrace the adjacent end of the pin 58 carried by the lever-arm 56, this cam-slot being slightly less eccentric than the cam-slot 64 to the rock-shaft 43. Thus, in the rearward movement of the lever-arm 56, the action of the pin 58 will be earlier upon the link 61 than the link 68, so as to successively disengage their respectively notched lugs from the pin-extensions 57. The bevel-pinion $64^x$ meshes with a similar pinion 69 fixed upon the lower end of a vertical shaft 70 journaled in the machine frame and having secured upon its upper end a swinging arm 71 whose lower edge rests upon a flat marginal seat 72 formed upon the top of the base-member 2. The arm 71 has secured upon its free end portion the wear plate 73.

In the operative movement of the lever-arm 56, the action of the pin 58 upon the cam-slot 64 causes the disengagement of the lug 62 from the pin-extension 57 before the lever-arm reaches extreme backward position, whereby the lateral movement of the hanger 49 in bringing the lower cutter into register with the upper cutter is completed while the lever-arm 56 is still operatively connected with the link 68. As the arm 56 nears the completion of its backward movement, the pin-extension 57 becomes similarly disengaged from the notched lug of the link 68. The consequent advance of the arm 71 from retracted position into operative position beneath the lower cutter is completed just before the cutter-carrying arm 41 completes its operative movement, so that the arm 71 with its wear-plate 73 becomes interposed between the forward end of the lever-arm 47 beneath the cutter 46 and the fixed seat 72 of the frame in the cutting operation, and insures a solid foundation to receive the thrust of the upper cutter member upon the lower cutter.

The bed-plate 1 is provided at one side of the frame member 2 with a longitudinal aperture $1^x$ in which are pivoted upon the common fulcrum screw-pin 74 two forwardly extending locking levers 75 and 76 each having secured by means of a set-screw 77 in a transverse aperture therein a laterally extending pin 78 of angular cross-section. Each of these levers has a tail $75^x$ and $76^x$, respectively, whose upper edge, when tilted out of initial position has a curvature concentric with the rock-shaft 43, the former being adapted for engagement with a projection 79 at the lower end of the lever 56 and the other being adapted to engage the extremity of said lever somewhat above the projection 79. In the advance position of the arm 56, its lower extremity lies directly above said locking levers which are held in their lower positions with their tails upwardly inclined, as represented in Fig. 4. As the swinging arm 56 moves backwardly during a cutting operation, the projection 79 first encounters the end of the tail 75× to tilt the lever 75 upon its fulcrum-pin so as to bring the lateral pin or tooth 78 into a notch 80 formed in the lower edge of the link 61 within which it is maintained during the continued movement of the lever 56 in contact with the tail 75×, the pin-extension 57 having been disengaged from the notched lug 62 before the seating of the pin 78 within its notch 80 of the link 61. The pin 78 of the other locking lever 76 is caused to similarly engage a notch in the inner side of the link 68 under the operation of the lever 56, but at a somewhat later time corresponding with the operative movement of the link 68. These locking levers thus afford means of holding their respective links securely in position while disengaged from the pin-extensions 57. The retraction of the lever 56 to initial position obviously produces a reversal of the actions just described, the links 61 and 68 being unlocked preparatory to their return to initial positions.

The machine, as actually constructed, is provided with a traveling work-clamp which is shifted from operative relation with the stitch-forming mechanism into register with the cutter for the cutting operation and then returned to its former position.

As represented more particularly in Fig. 8, the worm-wheel 28 is cut out in one side to form a radial recess to receive the slide-block 81 formed in one end with the supplemental worm-teeth 28× and at the other end with a hollow boss 82 slidingly fitted within a radial socket of the worm-wheel and provided with the spring 83 normally pressing said block outwardly into register with the adjacent peripheral worm-wheel teeth, its range of motion being limited by the stop-screw 84 extending through the side of the worm-wheel into a longitudinal slot 85 in the boss 82 whose ends it is adapted to engage.

The slide-block 81 has a lateral lug 86 whose outer wedge-shaped extremity is normally engaged by the cammed extremity 87 of the laterally extending arm 88 of a rock-shaft 89 having fixed upon its opposite end on the other side of the standard 4 the depending arm 90. The arm 88 is drawn downwardly by means of the spring 91 extending between the same and a screw-stud 92 upon the standard 4, so as to rest normally upon a shoulder afforded by the top of the upper bearing lug 93 for the worm-shaft 26. Depending from a lug 94 secured upon the top of the frame is a spring detent-arm 95 whose enlarged lower end is provided in one edge with a notch 96 normally embracing the lug 86 of the yielding worm-wheel section 81 in its inner or retracted position, when engaged by the heel of the cammed extremity 87 of the lever-arm 88.

The lifting of the lever-arm acts to disengage the lug 86 from the lower end of the cam member 87 and thus permits the worm-wheel section 81 to assume engagement with the worm 27 whereby rotary motion is imparted to the worm-wheel. As the worm-wheel nears completion of a rotation, the lug 86 engages the upper end of the cam-member 87 and is thereby forced inwardly to retract the toothed section from engagement with the worm, the lug 86 at the same time thrusting aside the yielding arm 95 until it comes into register with the holding notch 96 therein at the end of a complete rotation, when the arm 95 snaps into initial position wherein it embraces and securely holds the lug 86 and locks the worm-wheel against further movement. The outward movement of the lug 86 when released by the shifting of the cam member 87, obviously permits its escape from the holding notch 96 for a subsequent rotation under the action of the worm 27.

The hub portion 10× of the hand-wheel 10 constitutes one of two spaced thrust-members fixed upon the forward portion of the main-shaft of which the other is the disk 97 which is in practice secured thereon by set-screws and locked against turning upon the shaft by means of a plate 98 having a projection 99 entering the keyway 9× of the shaft. Loosely mounted upon the shaft 9 between the thrust-members 10× and 97 is a pair of collars represented in the drawings as formed of circular plates or disks 100 and 101 provided upon their adjacent faces respectively with annular series of projections 102 and 103, with inclined adjacent ends 102× and 103× adapted for wedge-like engagement when said disks are relatively turned to force them apart and into frictional engagement with the adjacent thrust members, or with the frictional washers 104 105 interposed between the same, as represented in Fig. 2.

The disk 100 is provided with a forked lug 106 having the transverse adjusting screw 107 and is adapted to embrace the forward end of a rock-shaft 108 journaled in a suitable bearing of the standard 4; by means of which it is restrained against rotation with the shaft 9. The other disk 101 has a lateral arm 109 upon which is fulcrumed by means of the screw 110 the elbow-lever 111 formed with a lateral arm carrying a stud-screw 111ˣ upon which is journaled the wearing block 112 yieldingly retained in normal position upon said arm by means of the spring 113. The wearing block 112 is adapted to rest upon the eccentric periphery of the cam-ring 114 secured by set-screws 114ˣ upon the hub of the disk 97. A depending arm of the elbow-lever 111 carries a stud 115 which enters a curved slot 116 in the cam-lever 117 fulcrumed by means of the stud-screw 118 upon the post 119 rising from the bed-plate 1.

The cam-lever 117 is connected by means of the screw-bolt 120 with the lower end of a link 121 whose upper end is connected by means of the screw-stud 122 with a forwardly projecting crank-arm 123 fixed upon the rock-shaft 108. The link 121 is normally drawn downwardly to force the cam-lever into its lower or stopping position by means of a spring 124 connected at one end with a hook 125 carried by the link 121 and at the other end to a screw-stud 126 carried by the standard 119 whose flattened upper extremity 119ˣ affords a stop for engagement with the lateral arm 127 secured to the lower portion of the link 121 for limiting the downward throw of the latter under the action of its spring.

The rock-shaft 108 has fixed upon its opposite end, at the opposite side of the standard 4, the defending clutch-lever 128 which carries an inclined wearing piece 129 adapted for engagement with the rounded projecting central portion 130 of a plate 131 secured by screws 132 in the rearward face of the loose pulley-wheel 11 which is normally pressed outward to separate the clutch members 12 and 13 by means of a spring 133 interposed between the inner end of an inclosing socket 134 of the shaft 9 and the plug 135 fitted to said socket and having its opposite end resting in contact with the inner face of the plate 131, as represented in Fig. 2. The clutch-lever 128 carries a stud 136 upon which is mounted the shouldered angular tripping-piece 137 formed with a nose 138 normally lying in the path of movement of the tappet 139 secured to the hub of the gear-wheel 140 loosely mounted upon the transverse shaft 141 and meshing with a similar gear 142 rotating with the worm-wheel 143 which is mounted upon the stud 144ˣ and has its peripheral teeth in mesh with the lower worm 144 fixed upon the upright worm-shaft 26.

Like the worm-wheel 28, the worm-wheel 143 has a radially yielding spring-pressed section 145 carrying a lateral stud 146 adapted to be thrust inwardly by the cam-member 147 of the swinging lever 148 fulcrumed at 149 upon the machine frame, the stud being normally locked in position by means of the yielding arm 150 secured to the lug 151 projecting from the standard 4, and the arm 148 being drawn downwardly to seat itself upon the top of the worm-shaft bearing 93 by means of the spring 152. The lifting of the arm 148 permits the engagement of the worm-wheel section 145 with the worm 144 whereby the worm-wheel is caused to perform a single rotation which produces the operative engagement of the tappet 139 with the nose 138 of the angle-piece 137 to shift the clutch-lever 128 from retracted inoperative position forwardly into operative engagement with the driving element 11 carrying the loose clutch member and the consequent coupling of such driving element with the main-shaft.

The rock-shaft 108 has secured thereto the rearwardly extending forked arm 153 provided with the short branch 154 and the longer branch 155 behind the same which is provided with a socket in which is secured the bent rod 156. The rearward extremity of the branch 154 is sufficiently wide to receive the operative shoulder 157 of the latch-lever 158 mounted upon the fixed fulcrum-screw 159 and having the rearwardly extending tail 160, and also the hooked outer end 161 of the upwardly extending arm 162 of an angular locking lever fulcrumed upon the stud 163 and having a tripping arm 164. The hub of the latch-lever 158 is encircled by a spring 165 by means of which it is normally pressed into operative relation with the member 154 of the arm 153, and its tail 160 lies in the path of movement of the stud-pin 166 upon the gear-wheel 167 which forms a member of the feeding mechanism, so as to be disengaged from the arm 153 after the stitching and feeding has progressed to a certain extent.

A second gear-wheel 168 of the feeding mechanism meshing with the wheel 167 carries a tripping stud 169 which engages the inturned lower extremity of the tripping arm 164 when the rotation of the main-shaft is arrested, so as to cause the retraction of the operative extremity 161 of the locking arm 162 in opposition to its spring 170 encircling its hub; but as soon as the intermeshing gears 167 168 are set in motion for the feeding action, the tripping stud 169 is disengaged from the locking lever-arm 164, so that the arm 162 is permitted to assume operative relation with the rock-shaft arm 153 before the disengagement therefrom of the latch-lever 158.

The rock-lever arm 153 is formed upon its upper side with a lug 153ˣ carrying a fulcrum-pin 171 upon which is mounted an angle-lever having a forwardly projecting arm 172 connected by means of the link 173 with a screw-stud 174 upon the locking lever-arm 162, while a second arm 175 of said angle-lever carries a stud-screw 176 embraced by the apertured end of a pawl-lever 177 having a hooked outer end 178 carrying a lateral screw-pin 179. The outer end of the pawl-lever 177 is pressed downwardly by means of a spring 180 secured at one end by means of the screw 181 to the angle-lever 172 175 and having its opposite end entering an aperture in a lug 182 of the pawl-lever 177 (Fig. 7).

The depending arm 90 of the cutter-controlling rock-shaft 89 is formed at its lower end with the lateral lip 90˟ disposed beneath the pawl-lever 177 and adapted to be engaged by the same at the completion of a stitching operation, as represented in Fig. 6. The action of the tripping stud 169 to disengage the locking lever from the rock-shaft arm 153, permits the rocking of the shaft 108 under the action of the spring 124 in bringing the main-shaft to rest and causes the bodily lifting of the angle-lever 172 175 with the arm 153. The link connection 173 of the rock-lever arm 172 with the now stationary stud 174 causes the rocking of the rock-lever and forward movement of the pawl-lever 177, which draws forward the arm 90 of the cutter-controlling rock-shaft 89, thereby lifting the cam-arm 88 and effecting a rotation of the cutter-actuating worm-wheel 28 to cut a previously stitched buttonhole.

The cam-arm 148 carries a stud-screw 183 which is connected with the lower end of an upwardly extending rod 184 suitably guided and provided upon its forward face with a roller 185, as represented in dotted lines in Fig. 4. Journaled in a transverse bearing sleeve 186 tapped into the standard 4 slightly below the roller-stud 185 is a rocking pin 187 carrying upon its rearward end the forwardly extending cam-finger 188 adapted for engagement with the roller stud 185 to raise the rod 184 so as to lift the cam-arm 148 for effecting a rotation of the gears 140 142 whereby the tappet 139 is caused by its engagement with the tripping-piece 137 to throw the clutch-lever 128 into the operative position represented in Fig. 4, for starting the main-shaft.

The forward end of the rocking pin 187 has fixed thereon a depending arm 189 having its lower extremity bent forwardly into an extension 190 formed intermediate its ends with a shoulder 191. The arm 189 is normally pressed backwardly into retracted position by means of a spring 192 secured thereon and having an arm resting upon the hub of the latch-lever 158.

Secured to the frame member 5 is a bracket 193 carrying a fulcrum-stud 194 upon which is mounted the rock-lever 195, the depending arm of which is formed with a finger-piece 196 and the upwardly and rearwardly extending arm of which carries a pivotal pin 197 to which is connected one arm of the starting rod 198 which passes through an aperture 199 in the bracket 200 and is formed with a downwardly and rearwardly directed extension 201 formed at its rearward extremity with a depending forked lug 202 embracing the extension 190 of the arm 189 and resting thereon intermediate the body of said arm and the shoulder 191. The starting rod is shown formed upon its upper edge with a stop lug 198˟ adapted for engagement with the bracket 200 to limit the operative movement of the starting rod. Secured to the extension 201 of the starting rod by means of the fastening screw 203 is a pawl-lifting plate 204 normally disposed out of operative relation with the screw-pin 179 carried by the pawl-lever 177, but adapted for operative engagement therewith to disengage the pawl-lever from the member 90˟ of the cutter-controlling rock-shaft arm 90.

In the normal operation of the machine, the controlling devices are relatively disposed substantially as represented in Figs. 6 and 7. Pressure by the operator upon the finger-piece 196 of the rock-lever 195 draws the starting rod 198 forward, thereby engaging the forked lug 202 of the latter with the shoulder 191 of the rocking arm 189, which causes the turning of the cam-finger 188 to lift the rod 184 for imparting an operative cycle of movement to the clutch-lever actuating mechanism. The shifting of the clutch-lever 128 into operative position, as represented in Fig. 4, serves to rock the shaft 108, by means of which the arm 153 is lowered into running position wherein it is initially retained by the spring-actuated latch-lever 158. The automatic shifting of the clutch-lever causes the elevation of the arm 123 of the rock-shaft 108 and the corresponding movement of the cam-arm 117 to disengage the stopping devices controlled by the elbow-lever 111.

The starting rod is permitted by the position of its stop-lug 198˟ to advance slightly beyond the position required to give the necessary movement to the controlling rock-shaft 89, and in its advance, the forward end of the swinging arm extension 190 acts as a fulcrum which rises in a circular arc concentric with the rocking pin 187, thereby lifting the starting rod extension 201 for disengagement of the lug 202 from the shoulder 191, and thus permitting the arm 189 to return to initial position under the action of its spring 192 so as to insure the prompt return of the cam-arm 148 to initial position under the action of its spring 152 and thus prevent repeated rotations in succession of the worm-wheel 143 and its connected mechanism. The extension 190 is provided with a lateral stop-pin 190˟ adapted for engagement with the forked lug 202, so as to prevent the excessive throw of the arm 189 under the action of its spring 192 when its shoulder 191 becomes disengaged from said lug.

As the operation of the machine continues, the recession of the tripping stud 169 releases the locking lever-arm 164 and permits the locking arm 162 to assume operative relation with the extremity 154 of the rock-shaft arm 153, after which the initially acting latch-lever 158 is disengaged therefrom by the action of the spud-pin 166 upon the tail 160 of such latch-lever. In the stitching of the second side of the buttonhole, the feeding mechanism reverses, and the tripping stud 169 is finally carried into engagement with the arm 164 of the locking lever, thereby rocking the same to disengage its locking arm 162 from the rock-lever arm 153. The release of the arm 153 permits the shaft 108 to be rocked under the action of the spring 124 to retract the clutch-lever 128 in disengaging the clutch members 12 and 13 for uncoupling the main-shaft from its driving element, and at the same time the descent of the link 121 causes a corresponding movement of the cam-lever 117 and rocking of the elbow-lever 111 by travel of the stud 115 in the cam-slot 116. This movement of the parts under the action of the spring 124 brings the wearing block 112 into forcible contact with the periphery of the cam-ring 114, and as this rides up the eccentric portion of such periphery, the lever 111 is shifted forwardly around the stud 115 as a fulcrum, thereby correspondingly moving the fulcrum-pin 110 and turning the plate 101 to forcibly engage its wedge-shaped cam projections with those of the stationary plate 100, by means of which said plates are separated and are forcibly pressed into frictional engagement with the thrust members 10ˣ and 97 or the interposed washers 104 and 105, respectively, to overcome the momentum of the main-shaft and the parts connected therewith.

By the normal operation of the means hereinbefore described, the cutting mechanism is thus automatically thrown into action by its connection with the stop-motion device at the completion of a buttonhole stitching operation. In case of breakage of the thread or other emergency making it desirable that the cutting action should not take place, it is merely necessary after starting the mechanism, as before described, for the operator to tilt the rock-lever 195 in the opposite direction, as represented in Fig. 1, so as to shift the starting rod 198 backwardly. This action shifts the pawl-lifting plate 204, normally ineffective in performing any function, beneath the stud-pin 179 of the pawl-lever 177, so as to lift the hooked end 178 of the latter above the lateral lip 90ˣ of the cutter-controller rock-shaft arm 90 and prevent the actuation of the latter consequent upon its normal connection with the stop-motion device in bringing the main-shaft to rest.

In the machine as actually constructed, the work-holder is opened and the stitching mechanism is turned through a semi-rotation into initial position subsequent to the stitching and cutting operations by means of a connection with the train of gearing 140, 142, 143 which receives its second actuation from the cutting mechanism. In order that the parts may be returned to initial position at the completion of a buttonhole producing cycle omitting the cutting operation, it is only necessary for the operator to again actuate the rock-lever 195 as in starting the machine, which causes the rocking of the arm 189 and engagement of the cam-finger 188 with the roller-stud 185 whereby the cam-arm 148 is lifted and the train of mechanism referred to operatively connected with the actuating worm 144. As this action is effected when the arm 153 supporting the bellcrank 172 175 is in its upper or stopping position, it will be observed that these parts are not moved a second time thereafter, but remain inoperative, so that the swinging arm 90 is not acted upon to start the cutting mechanism during the remainder of the cycle.

As fully described in our said Patent No. 1,030,998, the segmental feed-pawl carrying plate 205 is mounted upon a vibrating lever 206 which is fulcrumed upon a stud 207, and derives operative movements from a connection with the main-shaft. The plate 205 has pivotally mounted thereon the spring-pressed plural-armed pawls 208, 209 and 210 adapted for operative engagement respectively with the peripheral teeth of the ratchet-wheels 211, 212 and 213, the ratchet-wheels 211 and 212 being connected for rotation with the gear-wheels 167 and 168, while the ratchet-wheel 213 exercises the function, as regards the feeding mechanism, of a dwell-producing member. A series of detent-levers 214, 215 and 216 is pivotally mounted upon the jogging pawl-carrying plate 205 each adjacent one of said pawls, and is formed with a notched extremity adapted for engagement with an arm of said pawl. A series of pawl-lifting levers 217, 218 and 219 is also mounted upon the pawl-carrying plate, each adjacent its respective pawl.

When the machine is at rest, all of the pawls are disengaged from their respective ratchet-wheels. At the beginning of a stitching operation, the detent-pawl 214 is retracted and the pawl 208 adapted to assume operative relation with the ratchet-wheel 211, thereby imparting reverse step-by-step rotary movements to the gear-wheels 167 and 168, and imparting through suitable connections the requisite traveling movements to the work-clamp for the first-side stitching operation. Upon the engagement of the stud-pin 166 with a lateral arm of the pawl-lifting member 217, this is rocked to retract the pawl 208 which is detained in retracted position by the detent-lever 214. The rocking of the pawl-lifter 217 acts through the connecting rod 220 to retract the detent-lever 216, thus permitting the pawl 210 to assume operative relation with the ratchet-wheel 213 which continues during the stitching of the end of the buttonhole, at the completion of which the engagement of the tripping lug 213×  moving with the ratchet-wheel 213 with a lateral arm of the pawl-lifter 219 causes the extremity of the pawl-lifting arm to engage a lateral arm of the pawl 210 to retract the same, and simultaneously the engagement of a pin 219× carried by the pawl-lifter with the extremity of the push-rod 221 connected with the detent-lever 215 causes the retraction of the latter to permit operative engagement of the pawl 209 with the reverse feed ratchet-wheel 212, whereby the work-holder is moved in the opposite direction for the stitching of the second side of the buttonhole. At the completion of the reverse feeding movement, the engagement of the tripping stud 169 with the locking lever 164 162 causes the arrest of the main-shaft, as already described.

The detent-lever 214 is shown in Fig. 1 provided with an upwardly extending arm 222 carrying a tilting contact-plate 223 pivoted thereto by means of the stud-screw 224. When the clutch-lever 128 is actuated to start the main-shaft, the rock-lever arm 153 descends and carries with it the feed-controlling rod 156 which brushes past the adjacent face of the contact-plate 223 and thereby rocks the detent-lever 214 to release the feed-pawl 208 for inaugurating the feeding action. The contact-plate 223 is pivotally and yieldingly mounted upon its supporting stud-screw 224 in a manner well known so as to maintain a rigid relation with the supporting arm 222 of the detent-lever during the downward movement of the rod 156, but in the upward movement of the latter following the tripping of the stop-motion, the contact-plate is merely tilted thereby without rocking the pawl-detainer, thus insuring against the premature release of the initial feed-pawl before the beginning of a succeeding buttonhole-producing cycle.

Having thus set forth the nature of the invention, what we claim herein is:—

1. In a buttonhole stitching machine, the combination with stitch-forming mechanism and automatically controlled slit-cutting mechanism, of a manually actuated starting device for the stitch-forming mechanism, and means controllable by said starting device independently of the normal action of the latter for preventing the action of the cutting mechanism at the will of the operator.

2. In a buttonhole stitching machine, the combination with stitch-forming mechanism, actuating means therefor, slit-cutting mechanism, and means independent of said actuating means for operating said slit-cutting mechanism, of a starting device whereby said stitch-forming and cutting mechanisms are automatically successively coupled with their respective actuating means, and means connected with said starting device whereby the coupling of the cutting mechanism with its actuating means may be prevented.

3. In a buttonhole stitching machine, the combination with stitch-forming mechanism, actuating means therefor, slit cutting mechanism and independent actuating means therefor including two interengaging members, means for disconnecting said members, a locking device for maintaining said members disconnected during the stitch-forming operation, a stop motion for said stitch-forming mechanism, an operative connection between said stop motion and the locking device, and means for rendering said connection ineffective at will.

4. In a buttonhole sewing machine, the combination with stitch-forming mechanism, actuating means therefor, slit cutting mechanism and actuating means therefor independent of that for the stitch-forming mechanism and with which the cutting mechanism has a permanent connection, automatically operated means adapted to move into engagement with and throw into action the cutting mechanism actuating means, and means for preventing such engagement at the will of the operator.

5. In a buttonhole stitching machine, the combination with stitch-forming mechanism, actuating means therefor, a stop-motion for controlling the operative relation of the stitch-forming mechanism and its operating means, a starting device whereby the stop-motion is operated to set in motion the stitch-forming mechanism, slit-cutting mechanism, actuating means therefor, automatically acting means for coupling the cutting mechanism with its actuating means, and means connected with the starting device and acting independently of the stop-motion for rendering the coupling means ineffective.

6. In a buttonhole stitching machine, the combination with stitch-forming mechanism, actuating means therefor, a stop-motion for controlling the operative relation of the stitch-forming mechanism and its operating means, a starting device whereby the stop-motion is operated to set in motion the stitch-forming mechanism, slit-cutting mechanism, actuating means therefor, automatically acting means for coupling the cutting mechanism with its actuating means, a detachable connection between the stop-motion and said coupling device, and means including said starting device whereby said connection may be detached at the will of the operator.

7. In a buttonhole stitching machine, the combination with stitch-forming mechanism, actuating means therefor, a stop-motion comprising a swinging lever and adapted for controlling the operative relation of the stitch-forming mechanism and its operating means, means for shifting said lever to set the stitch-forming mechanism in operation, slit-cutting mechanism, actuating means therefor, independent of the stitch-forming mechanism, coupling means between the cutting mechanism and its actuating means, positively acting locking means for holding said coupling means ineffective, and an operative connection between said swinging lever and said locking means whereby the latter may be actuated.

8. In a buttonhole stitching machine, the combination with stitch-forming mechanism, actuating means therefor, a stop-motion comprising a swinging lever and adapted for controlling the operative relation of the stitch-forming mechanism and its operating means, means for shifting said lever to set the stitch-forming mechanism in operation, slit-cutting mechanism, actuating means therefor, a self-acting coupling member between the cutting mechanism and its actuating means, a locking device for said coupling member, a detachable operative connection between said swinging lever and said locking device, and means for interrupting said connection.

9. In a buttonhole stitching machine, in combination, a main-shaft, a driving element, a stop-motion adapted to establish and interrupt operative relation between the main-shaft and said driving element, stitch-forming mechanism connected with the main-shaft, feeding mechanism, actuating means therefor connected with the main-shaft, coupling means for connecting the feeding mechanism with its actuating means, slit-cutting mechanism, actuating means for the cutting mechanism independent of the main-shaft, a coupling device for connecting the cutting mechanism and its actuating means, and means independently connecting said feeding mechanism and said cutting mechanism coupling devices with the stop-motion, whereby the feeding and cutting operations are effected successively.

10. In a buttonhole stitching machine, the combination with stitch-forming mechanism and automatically acting slit-cutting mechanism, and means whereby said stitch-forming and slit-cutting mechanisms are caused to operate in succession, of a manually actuated starting device whereby one of said mechanisms is initially thrown into operation, and means controllable by said starting device for preventing the action of the cutting mechanism at the will of the operator, the control by the starting device being independent of its normal action.

11. In a buttonhole stitching machine, the combination with stitch-forming mechanism and operating means therefor, of slit-cutting mechanism and means independent of said operating means for actuating said slit-cutting mechanism, automatic controlling means for the slit-cutting mechanism normally effective to start the latter at the close of the stitch-forming operation, a starting device for the stitch-forming mechanism, and means connected to said starting device for rendering ineffective said automatic controlling means.

12. In a buttonhole stitching machine, the combination with stitch-forming mechanism and operating means therefor, of slit-cutting mechanism and means independent of said operating means for actuating said slit-cutting mechanism, automatically controlled starting means connecting said mechanisms whereby they are successively active, a starting element for one of said mechanisms and operative connections between said starting element and said automatically controlled starting means whereby actuation of the subsequently acting mechanism may be prevented at the will of the operator.

13. In a buttonhole stitching machine, the combination with stitching mechanism, of a main drive shaft, a clutch interposed between said shaft and the source of power, stop devices attached to said shaft and coacting with said clutch, slit-cutting mechanism, actuating means therefor, latch mechanism normally holding said actuating means out of engagement with said slit-cutting mechanism, and connections between the clutch, stop devices and the aforesaid latch mechanism whereby at the end of the stitching operation said clutch is disengaged and the stop devices thrown into operation, and simultaneously therewith the latch mechanism is automatically released to throw said actuating means into engagement with the slit-cutting mechanism.

In testimony whereof, we have signed our names to this specification, in the presence of two subscribing witnesses.

JAMES G. GREENE.
LOUIS F. A. BÜCHNER.

Witnesses:
HENRY J. MILLER,
HENRY A. KORNEMANN, Jr.